(12) United States Patent
Horii

(10) Patent No.: US 6,460,056 B1
(45) Date of Patent: *Oct. 1, 2002

(54) METHOD AND APPARATUS FOR DISPLAYING SIGN LANGUAGE IMAGES CORRESPONDING TO INPUT INFORMATION

(75) Inventor: Hiroyuki Horii, Hiratsuka (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/352,518

(22) Filed: Dec. 9, 1994

(30) Foreign Application Priority Data

Dec. 16, 1993 (JP) .............................. 5-316452

(51) Int. Cl.[7] .............................................. G06F 17/28
(52) U.S. Cl. ..................... 707/500.1; 434/112; 434/185; 704/1; 704/271
(58) Field of Search ................................ 395/2.44, 2.4, 395/2.69, 2.79, 2.8, 2.84, 2.85, 777; 707/515, 532, 500.1; 345/302; 704/3, 271, 276, 1, 2, 7; 434/185, 112, 167; 340/825.19; 725/1; 341/21

(56) References Cited

U.S. PATENT DOCUMENTS

| | | | |
|---|---|---|---|
| 4,878,843 A | * 11/1989 | Kuch ........................ | 434/112 |
| 4,884,972 A | * 12/1989 | Gasper ...................... | 434/185 |
| 5,031,121 A | * 7/1991 | Iwai et al. .................. | 395/777 |
| 5,473,705 A | * 12/1995 | Abe et al. ................... | 382/100 |
| 5,481,454 A | * 1/1996 | Inoue et al. ............. | 707/532 X |
| 5,544,050 A | * 8/1996 | Abe et al. ................... | 364/419 |
| 5,600,364 A | * 2/1997 | Hendricks et al. ............. | 348/1 |
| 5,659,764 A | * 8/1997 | Sakiyama et al. ............. | 704/3 |
| 5,734,923 A | * 3/1998 | Sagawa et al. ............. | 345/302 |
| 5,990,878 A | * 11/1999 | Ikeda et al. ................ | 345/302 |

FOREIGN PATENT DOCUMENTS

EP          0182460          5/1986

OTHER PUBLICATIONS

Kurokawa, *IEICE Trans. on Electronics, Communications, & Computer Science*, E–75A, Feb. 1992 "Gesture Coding And A Gesture Dictionary For A Nonverbal Interface," pp. 112–121.

Kawai et al., *Pattern Recognition*, v. 18, n. 3–4, Jan. 1985, "Deaf–And–Mute Sign Language Generation System" pp. 199–205.

Frishberg et al., *INTERCHI '93*, Apr. 24, 1993, pp. 194–197, "Sign Language Interfaces".

IBM Technical Disclosure Bulletin, vol. 34, No. 10A, Mar. 1992, p. 172, "Real–Time Closed–Caption Video".

* cited by examiner

*Primary Examiner*—Joseph H. Feild
(74) *Attorney, Agent, or Firm*—Fitzpatrick, Cella, Harper & Scinto

(57) ABSTRACT

In order to provide an image display method and apparatus capable of displaying images corresponding to document data or speech data, image data (such as sign language images) are stored in an image dictionary in motion picture form. Document data is read out from a character information storage device (or speech data is received), and a sign language image corresponding to a character string of the document data (or the speech) is selected from the image dictionary and displayed on a display.

7 Claims, 5 Drawing Sheets

METHOD AND APPARATUS FOR DISPLAYING SIGN LANGUAGE IMAGES CORRESPONDING TO INPUT INFORMATION

BACKGROUND OF THE INVENTION

1. Field of the Invention

The present invention relates to an image display method and apparatus for displaying images (e.g. motion pictures) corresponding to voice data or document data, and more particularly, to an image display method and apparatus capable of displaying sign language images corresponding to speech.

2. Description of the Related Art

The addition of voice data (such as a voice, music and the like) to video images has been long performed, and an apparatus which not only reproduces video images but generates sounds related to the images is well known.

However, there has been provided no apparatus which generates and displays images corresponding to input document data, voice signals and the like. For example, the contents of a television program are, as is well known, given to deaf persons by superimposing a caption on the screen or displaying the contents of speech in sign language on a part of the screen. However, since such caption and sign language displays incur much trouble and cost in editing, they are, as matters now stand, difficult to carry out.

Furthermore, the provision of information in characters, such as a caption, requires the deaf persons to make efforts toward understanding the information and to concentrate their attention on reading the characters.

SUMMARY OF THE INVENTION

It is an object of the present invention to provide an image display method and apparatus capable of displaying images corresponding to document data or voice data.

In order to achieve the above object, according to one aspect of the present invention, there is provided an image display apparatus comprising image storage means for storing image data, storage means for storing document data, readout means for reading out document data stored in the storage means and reading out image data corresponding to a character string of the document data from the image storage means, and display means for displaying the image data read out by the readout means.

The above structure makes it possible to display images corresponding to document data.

Since document data is displayed in a character pattern together with image data, the character pattern and the image data can be ascertained in correspondence.

Since image data to be displayed may be sign language image data corresponding to a word or a phrase, an easily recognizable image can be provided.

Since image data to be displayed may be a motion picture, an easily recognizable image can be provided.

The addition of an expansion means for expanding image data allows display image data to be stored under compression, thereby taking less memory.

According to another aspect of the present invention, there is provided an image display apparatus comprising image storage means for storing image data, speech input means for inputting speech therefrom, speech recognizing means for recognizing the speech inputted from the speech input means and generating a character code string corresponding to the recognized speech, readout means for reading out image data corresponding to the character code string from the image storage means, and display means for displaying the image data read out by the readout means.

Therefore, it is possible to generate images corresponding to speech.

According to still another aspect of the present invention, there is provided an image display method comprising the steps of inputting speech and recognizing the speech, and displaying an image corresponding to the speech based on the result of the speech recognition.

Therefore, it is possible to display images corresponding to speech.

Steps may be added for inputting a video signal together with speech, and compositely displaying an image corresponding to the video signal and the image corresponding to the recognized speech.

Other objects and features of the present invention will become clear upon reading the following description.

DESCRIPTION OF THE PREFERRED EMBODIMENTS

Preferred embodiments of the present invention will now be described with reference to the drawings.

Embodiment 1

Figure 1:
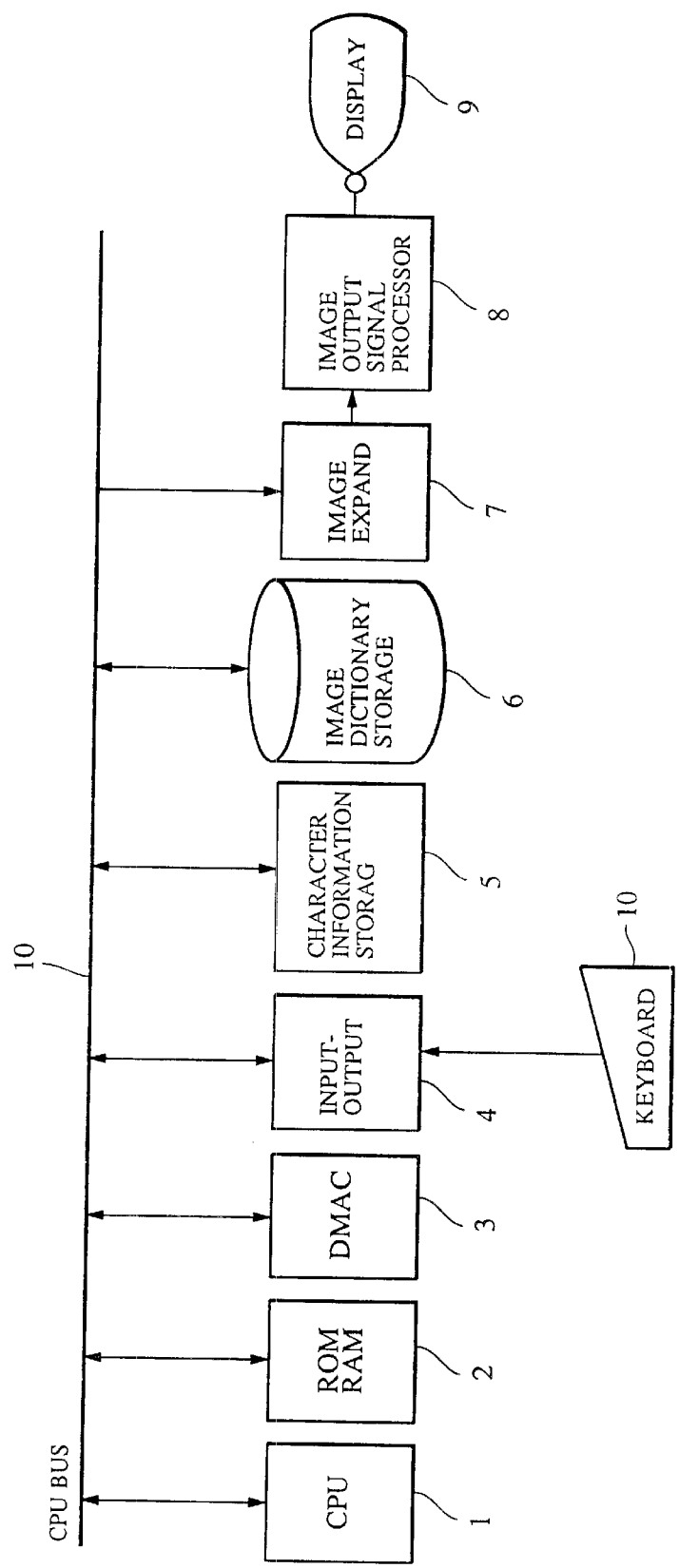
FIG. 1 is a block diagram showing the general structure of an image display apparatus according to a first embodiment of the present invention.

FIG. 1 is a block diagram showing the general structure of an image display apparatus according to a first embodiment of the present invention.

Referring to FIG. 1, a CPU 1 controls the whole apparatus, and a ROM/RAM 2 comprises a ROM in which a control program of the CPU 1 and various kinds of data are stored, and a RAM which is used as a work area of the CPU 1 and temporarily stores various kinds of data therein. A direct memory access (DMA) controller (DMAC) 3 is used to input and output data by DMA in the ROM/RAM 2, between the ROM/RAM 2 and an input-output 4, or among a character information storage device 5, an image dictionary storage device 6 and an image expansion device 7. The input-output 4 controls the interface between a keyboard 10 (which is operated by an operator to input document data, commands and the like therein) and unillustrated peripheral devices. Text inputted through the input-output 4 is stored in the character information storage device 5 which stores text data in character codes and the like. The image dictionary storage device 6 stores compressed image information corresponding to character information (words, phrases and so on). The image information includes, for example, sign language images (motion pictures) corresponding to words, phrases and so on. The image expansion device 7 expands and outputs the image information compressed and stored in the image dictionary storage device 6. An image output signal processor 8 outputs the expanded image information to a display 9, such as a CRT display. Numeral 10 denotes a CPU bus.

In the above structure, character information (character codes) stored in the character information storage device 5 is read out under the control of the CPU 1, and image data stored in the image dictionary storage device 6 is accessed corresponding to the character codes. In this case, the image dictionary storage device 6 stores sign language images corresponding to the character information; that is, words read out from the character information storage device 5. The sign language images may be obtained, for example, by adding motion to images produced by computer graphics or actually photographing persons.

The image data stored in the image dictionary storage device 6 is generally compressed because of its massive amount. In order to compress the image data, for example, the standard of Comité Consultatif Internationale Télégraphique et Téléphonique H. 261, Moving Picture Image Coding Experts Group and the like for compressing motion pictures may be used. The image data corresponding to the character information is transmitted to the image expansion device 7 by the DMAC 3. The compressed image data is expanded by the image expansion device 7, converted into video signals by the image output signal processor 8 and displayed on the display 9.

Figure 2:
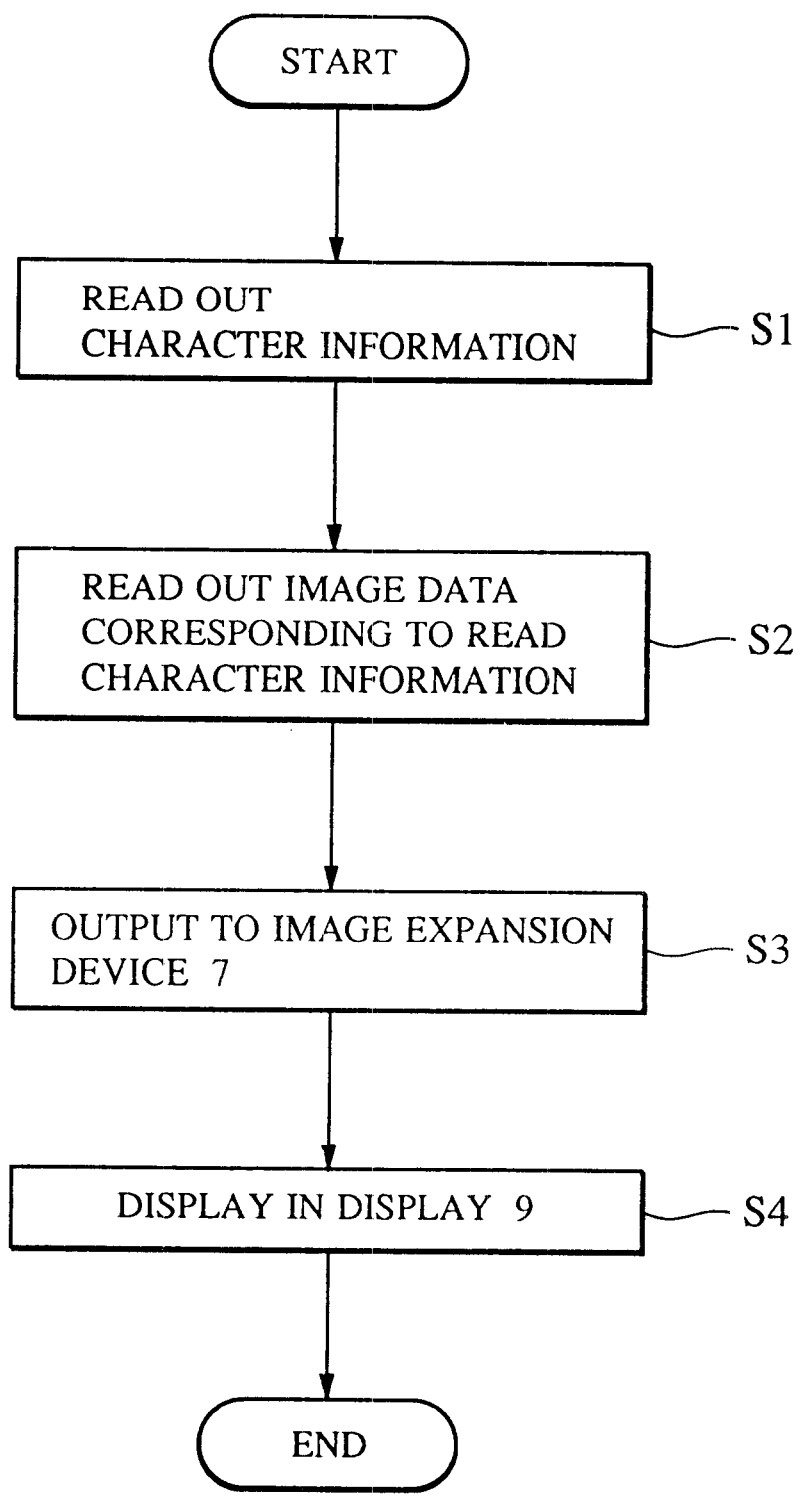
FIG. 2 is a flow chart explaining processing of the image display apparatus according to the first embodiment.

A flow chart of FIG. 2 explains the above process. A control program for carrying out the process is stored in the ROM/RAM 2.

Document data or various phrases are stored in the character information storage device 5, and the process is started, for example, in response to input of a command to read out the document data from the character information storage device 5 through the keyboard 10. First, the document data is read out from the character information storage device 5 in Step S1, image data corresponding to the read document data, such as character strings, words, phrases and the like, are read out from the image dictionary storage device 6 in Step S2, and the read image data (compressed data) is outputted to the image expansion device 7 in Step S3. The correspondence between the document data and the image data is determined, for example, by reading out storage addresses of the image data corresponding to the document data with reference to a table or the like stored in the ROM/RAM 2. In Step S4, the expanded image data is displayed on the display 9.

The steps S1 to S4 are sequentially carried out for character strings, words or phrases constituting the text stored in the character information storage device 5, and obtained images (motion pictures) are sequentially displayed on the display 9, thereby allowing understanding of the text in successive sign language images.

As described above, according to the first embodiment, image data corresponding to document data (for example, sign language images corresponding to speech) can be outputted and displayed.

Furthermore, if a character pattern generator for generating a character pattern corresponding to a character code is coupled to bus 10, it is possible to display in a part of the display 9 the text stored in the character information storage device 5 in character patterns while displaying sign language images corresponding to the character patterns. This configuration makes it possible to practice sign language and ascertain which part of the text is being displayed in sign language.

Embodiment 2

Figure 3:
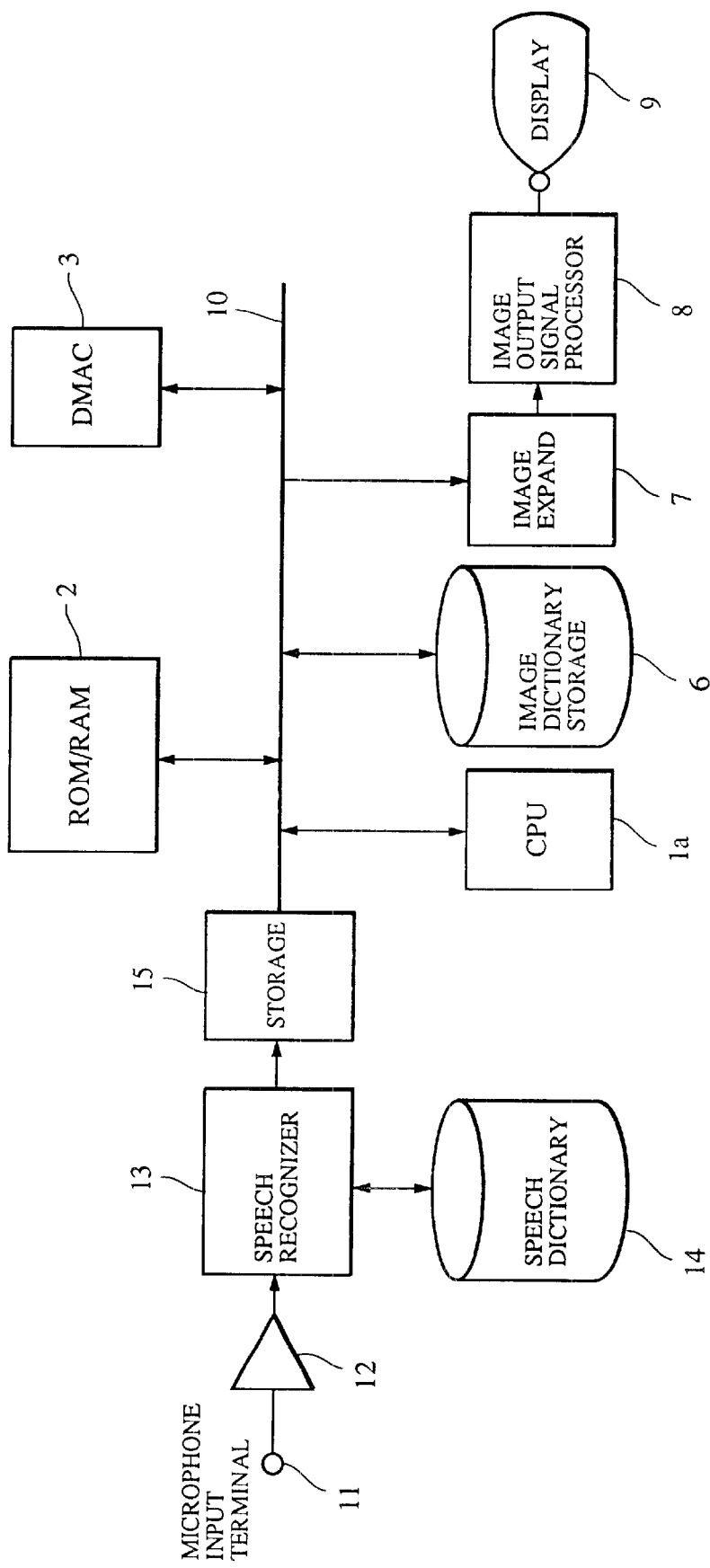
FIG. 3 is a block diagram showing the general structure of an image display apparatus according to a second embodiment of the preset invention.

FIG. 3 is a block diagram showing the general structure of an image display apparatus according to a second embodiment of the present invention. Components common to FIG. 1 are denoted by like numerals, and the description thereof is omitted.

Referring to FIG. 3, a voice signal inputted from a microphone input terminal 11 is amplified by an amplifier 12, inputted to a speech recognizer 13 to be recognized, and converted into a character code with reference to a speech dictionary 14. A storage device 15 stores the voice data recognized in the speech recognizer 13.

According to the above structure, the voice signal inputted from the microphone input terminal 11 is amplified by the amplifier 12, and recognized by the speech recognizer 13. The recognized voice data is converted into character data and stored in the storage device 15. The character data stored in the storage device 15 is read out by a CPU 1a, and image data stored in an image dictionary 6 is accessed in correspondence with the read-out character data. The image data related to the character data is transmitted to an image expansion device 7 by DMA under the control of a DMAC 3 in the same manner as described above. The compressed image data is expanded by the image expansion device 7, converted into video signals by an image output signal processor 8, and displayed on a display 9.

In this case, character data is sequentially read out from the storage device 15 and image data corresponding to the read-out character data is displayed on the display 9 in the same manner as in the above flow chart of FIG. 2.

As described above, according to the second embodiment, after an input voice signal is subjected to speech recognition, an image dictionary related to the recognized voice signal (for example, a sign language image) is read out and displayed on the display, thereby making it possible to convert and display voice data into sign language images in real time.

Embodiment 3

Figure 4:
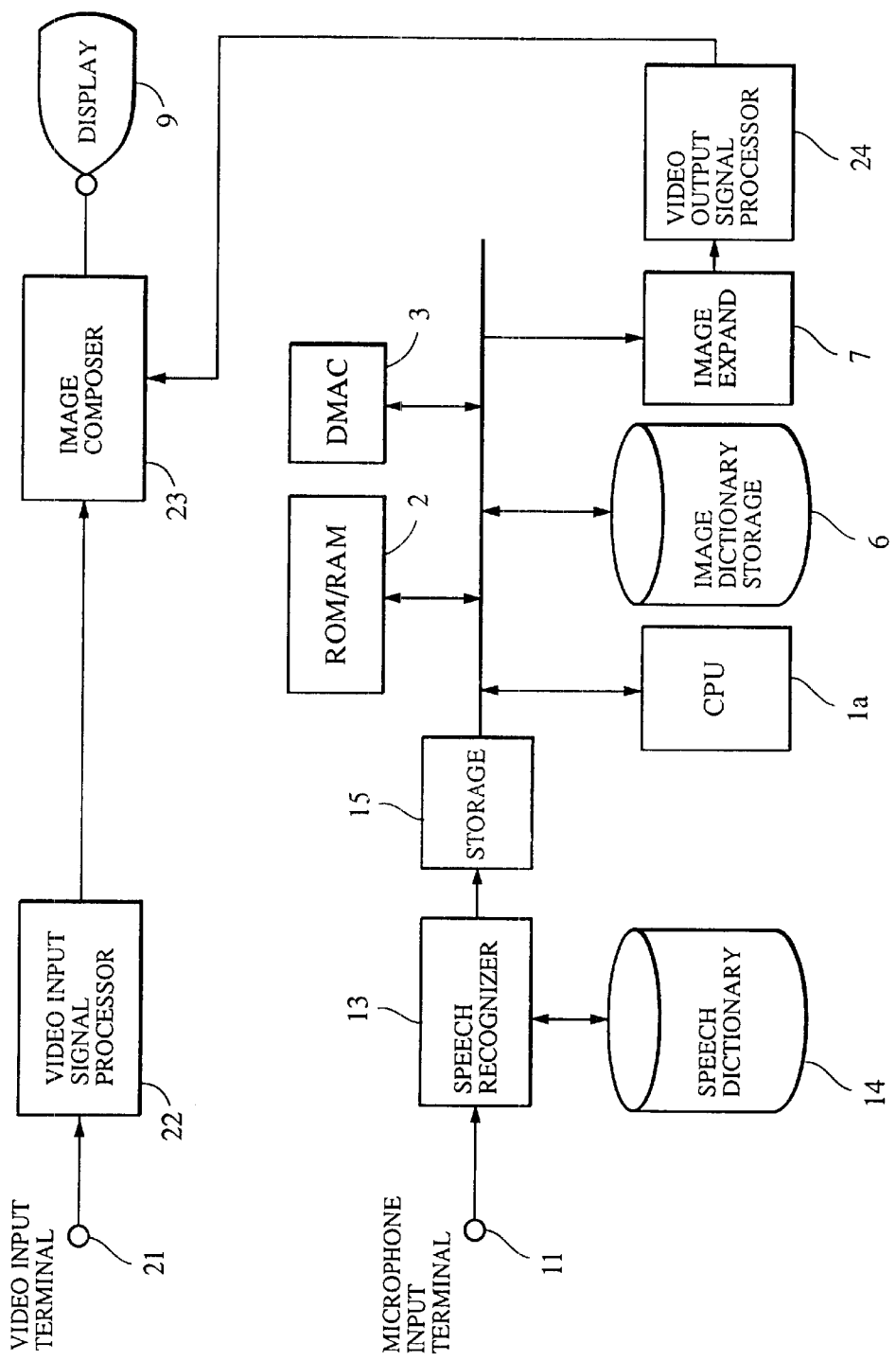
FIG. 4 is a block diagram showing the general structure of an image display apparatus according to a third embodiment of the present invention.

FIG. 4 is a block diagram showing the general structure of an image display apparatus according to a third embodiment of the present invention. Components common to FIGS. 1 and 3 are denoted by like numerals and the description thereof is omitted. Referring to FIG. 4, an input terminal 21 for inputting a video signal, a video input signal processor 22, an image composer 23 and a video output signal processor 24 are added to the structure shown in FIG. 3.

As described in the above second embodiment, a voice signal inputted from a microphone input terminal 11 is recognized and stored in a storage device 15. After that, a compressed image related to the recognized voice signal is read out from an image dictionary storage device 6. The compressed image is further expanded by an image expansion device 7, and then transmitted to the image composer 23 through the video output signal processor 24.

On the other hand, separately from the image corresponding to the voice signal, a video signal inputted from the video input terminal 21 is transmitted to the image composer 23 through the video signal input processor 22. The image composer 23 composes the inputted video signal and the image read out from the image dictionary storage device 6 (expanded), and outputs a composite on a display 9.

If speech inputted from the microphone input terminal 11 and a video signal inputted from the video input terminal 21 are in synchronization with each other in the structure shown in FIG. 4 (for example, a television program with video), since an image outputted from the video output signal processor 24 may lag behind a video signal outputted from the video input signal processor 22, a delay circuit (not shown) may be provided for delaying the video signal inputted from the video signal input terminal 21.

Figure 5:
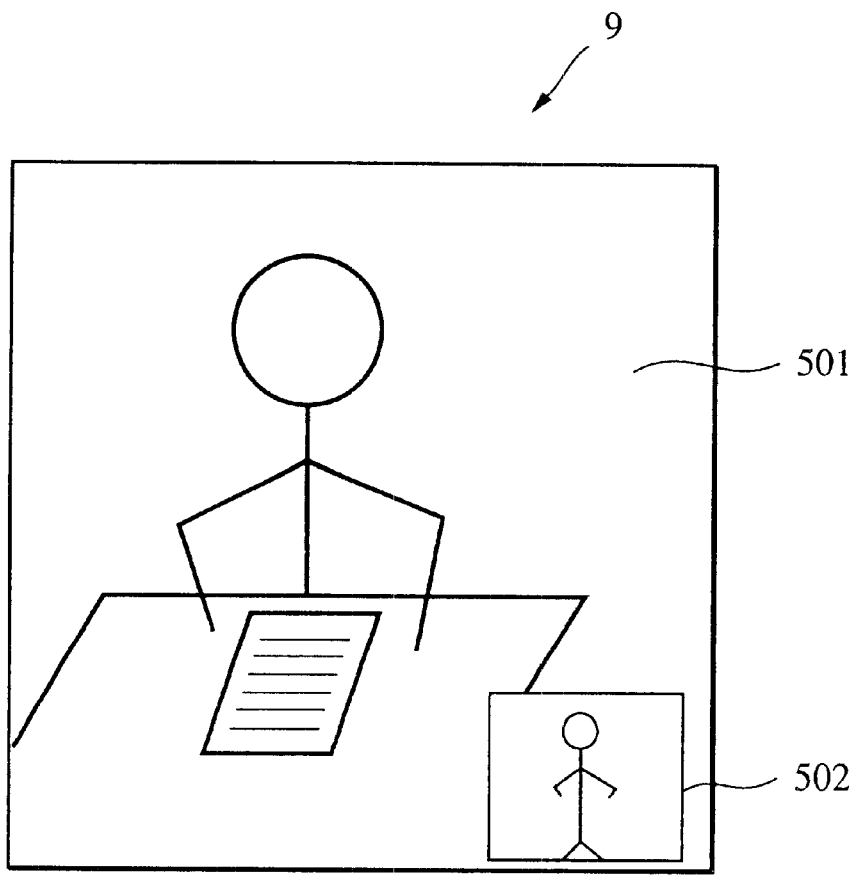
FIG. 5 is a display example of the image display apparatus according to the third embodiment of the present invention.

FIG. 5 illustrates an example of a composite image obtained in the third embodiment. Video signals inputted from the video input terminal 21 and sign language images read out from the image dictionary storage device 6 (expanded) are displayed as a composite picture on a main screen 501 and a subscreen 502 of the display 9.

As described above, according to the third embodiment of the present invention, a sign language image corresponding to speech inputted from, for example, a microphone and video signals inputted from the video input terminal 21 are displayed in composite form, and a television program or the like is displayed on the main screen 501 while displaying sign language images corresponding to the sound of the television program on the subscreen 502. Therefore, deaf persons can also enjoy the television program.

In the above embodiments, a speech synthesis device may be added for synthesizing speech inputted from the microphone input terminal 11 with information stored in the storage devices 5 and 15. In addition, a speaker or the like may be added in order to output speech as well as images at the display 9.

The present invention may be applied to a system constituted by a plurality of input and output devices, or one apparatus comprising one such device. Needless to say, the present invention may be applied to a case in which the system or the apparatus is provided with a program for carrying out the present invention.

The individual components shown in outline or designated by blocks in the Drawings are all well-known in the image display arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image display apparatus, comprising:

sign image storage means for storing a plurality of sign images each representing a word, in correspondence with the word;

input means for inputting a motion picture with speech;

speech recognition means for recognizing words included in the speech input from said input means;

retrieval means for retrieving from said sign image storage means, sign images each corresponds to a respective one of words recognized by said speech recognition means;

composition means for composing movie picture images including the motion picture input from said input means and sign images retrieved by said retrieval means; and display means for displaying the movie picture images composed by said composition means.

2. An image display apparatus according to claim 1, wherein said sign image storage means stores compressed sign images, and said apparatus further comprises expansion means for expanding compressed sign images retrieved by said retrieval means.

3. An image display apparatus according to claim 1, wherein motion picture images and speech input from said input means are synchronized.

4. An image display apparatus according to claim 3, wherein the motion picture with speech is a television program.

5. An image display apparatus according to claim 1, wherein said composition means composes the movie picture images with the motion picture images as a main window image, and the sign images as a sub window image.

6. An image display method comprising the steps of:

inputting a motion picture with speech;

recognizing words included in the input speech;

retrieving sign images, each corresponding to a respective one of the words recognized in said recognizing step, from sign image memory which stores a plurality of sign images each representing a word in correspondence with the word;

generating composed images by composing motion picture images input in said inputting step with sign images retrieved in said retrieving step; and displaying the composed images.

7. A computer-readable storage medium storing a program which executes the following steps:

inputting a motion picture with speech;

recognizing words included in the input speech;

retrieving sign images, each corresponding to a respective one of the words recognized in the recognizing step, from sign image memory which stores a plurality of sign images each representing a word in correspondence with the word;

generating composed images by composing motion picture images input in the inputting step with sign images retrieved in the retrieving step; and displaying the composed images.

* * * * *

UNITED STATES PATENT AND TRADEMARK OFFICE
CERTIFICATE OF CORRECTION

PATENT NO.    : 6,460,056 B1
DATED         : October 1, 2002
INVENTOR(S)   : Hiroyuki Horii It is certified that error appears in the above-identified patent and that said Letters Patent is hereby corrected as shown below:

Column 6,
Line 4, "corresponds" should read -- corresponding --.
Line 27, "sub windows" should read -- sub-windows --.

Signed and Sealed this

Fourth Day of March, 2003

JAMES E. ROGAN
*Director of the United States Patent and Trademark Office*